(12) United States Patent
Himeno

(10) Patent No.: US 12,086,280 B2
(45) Date of Patent: Sep. 10, 2024

(54) DOCUMENT MANAGEMENT SYSTEM

(71) Applicant: IRYOU JYOUHOU GIJYUTU KENKYUSHO CORPORATION, Fukuoka (JP)

(72) Inventor: Shinkichi Himeno, Fukuoka (JP)

(73) Assignee: IRYOU JYOUHOU GIJYUTU KENKYUSHO CORPORATION, Fukuoka (JP)

( * ) Notice: Subject to any disclaimer, the term of this patent is extended or adjusted under 35 U.S.C. 154(b) by 807 days.

(21) Appl. No.: 17/059,947

(22) PCT Filed: Jan. 8, 2020

(86) PCT No.: PCT/JP2020/000215
§ 371 (c)(1),
(2) Date: Nov. 30, 2020

(87) PCT Pub. No.: WO2020/149177
PCT Pub. Date: Jul. 23, 2020

(65) Prior Publication Data
US 2022/0269808 A1    Aug. 25, 2022

(30) Foreign Application Priority Data
Jan. 16, 2019  (JP) ................................. 2019-004913

(51) Int. Cl.
*G06F 21/62*   (2013.01)
*G06F 16/93*   (2019.01)
(Continued)

(52) U.S. Cl.
CPC .......... *G06F 21/6227* (2013.01); *G06F 16/93* (2019.01); *H04L 9/3236* (2013.01); *H04L 9/50* (2022.05)

(58) Field of Classification Search
CPC ...... G06F 21/6227; G06F 16/93; G06F 12/00; G06F 21/64; H04L 9/3236; H04L 9/50; H04L 63/123; G09C 1/00
See application file for complete search history.

(56) References Cited

U.S. PATENT DOCUMENTS 10,121,143 B1 * 11/2018 Madisetti ............... G06Q 40/04
10,516,674 B2 * 12/2019 Sayed ................. G06F 21/6209
(Continued)

FOREIGN PATENT DOCUMENTS

| JP | 2018032192 A | 3/2018 |
| JP | 2018166284 A | 10/2018 |

(Continued)

OTHER PUBLICATIONS

"Blockchain" Wikipedia article dated Jan. 15, 2018 (17 pages) https://en.wikipedia.org/w/index.php?title=Blockchain&oldid=820604754 (Year: 2018).*

(Continued)

*Primary Examiner* — Joseph P Hirl
*Assistant Examiner* — Thomas A Gyorfi
(74) *Attorney, Agent, or Firm* — Calfee, Halter & Griswold LLP

(57) ABSTRACT

[Problem] To ensure security in document management in small-scale organizations without using expensive servers by establishing peer-to-peer connection of a plurality of PCs, and to enable mutual non-tampering certification among connected organizations.

[Solution] Provided is a document management system in which is formed a PC group in which a plurality of small electronic computers for creating, recording, and viewing a document are connected via a communication channel, said system comprising i) an in-PC cluster document synchronization means which causes a document recorded on one (Continued)

FIG. 6

PC to be incorporated in recordings of other PCs belonging to a cluster, (ii) a document hash value generation means which generates a hash value of the document, and (iii) a blockchain generation means which assembles a plurality of the generated hash values and forms a block, connects the block to the existing blocks and forms a blockchain, and synchronizes and records same on the PCs within the PC cluster.

9 Claims, 5 Drawing Sheets

(51) Int. Cl.
*H04L 9/00* (2022.01)
*H04L 9/32* (2006.01)

(56) References Cited

U.S. PATENT DOCUMENTS

| | | | | |
|---|---|---|---|---|
| 10,860,659 | B1* | 12/2020 | Verma | G06F 40/197 |
| 11,176,550 | B2* | 11/2021 | Vintila | H04L 9/0637 |
| 11,488,271 | B2* | 11/2022 | Venkataraman | H04L 9/0863 |
| 11,669,640 | B1* | 6/2023 | Gibson | G06F 21/64 726/26 |
| 2018/0139042 | A1* | 5/2018 | Binning | G06Q 20/1235 |
| 2020/0134221 | A1* | 4/2020 | Su | G06F 21/64 |

FOREIGN PATENT DOCUMENTS

| | | | |
|---|---|---|---|
| JP | 2018182710 A | 11/2018 | |
| WO | 2017136879 A1 | 8/2017 | |
| WO | WO-2017143435 A1 * | 8/2017 | ............. G06F 16/27 |
| WO | 2018080574 A1 | 5/2018 | |
| WO | 2018186391 A1 | 10/2018 | |

OTHER PUBLICATIONS

"Blockchain," Wikipedia, last updated Nov. 8, 2020.
English Translation of International Search Report from PCT/JP2020/000215 dated Mar. 10, 2020 (2 pages).

\* cited by examiner

GROUP OF COMPUTERS MUTUALLY CONNECTED VIA LAN, WEB, OR THE LIKE BY WIRE OR WIRELESSLY

DOCUMENT MANAGEMENT SYSTEM

CROSS-REFERENCE TO RELATED APPLICATIONS

This application is a 371 of PCT Application No. PCT/JP2020/000215 filed on Jan. 8, 2020, which claims priority to Japanese Application No. 2019-004913, filed on Jan. 16, 2019, the contents of which are hereby incorporated by reference as if recited in their entirety.

TECHNICAL FIELD

The present invention relates to a document management system in which a plurality of PCs are linked by peer-to-peer (P2P) to achieve performing document management in a small organization inexpensively without using an expensive server, securing security by creating a document group clone in a remote location for backup in an emergency and limiting references from other organizations to remote locations, and enabling mutual non-falsification proof between collaborating organizations.

BACKGROUND ART

Recently, document creation using a personal computer (PC) has become commonplace. There are various usage forms of a PC, for example, using alone, a form that links with a server via LAN, and recently a cloud type that links with a virtual server via the Internet. A server or virtual server authenticates a user, centrally manages document data, and prevents fraud such as falsification.

Also, in recent years, a technology called blockchain has been attracting attention.

In this method, data such as documents and transaction records are distributed and recorded on a plurality of PCs or the like, a plurality of hash values of each data are collected (block formation), the hash value of this block data itself or a hash value of a block formed previously is used to calculate a connected chain between blocks, and the connection of blocks is extended.

Using this method, if change such as falsification or later addition or deletion is made on document data or the like, the hash value in the block and the hash value of the connected chain also change. In order to perform falsification to conceal fraud, it is necessary to change all the recorded blockchains of distributed PCs almost at the same time, but it is practically difficult.

In addition, when a blockchain inconsistency occurs between PCs, the inconsistency in the records of all PCs can be resolved by unifying the blockchain length to the longest one.

CITATION LIST

Patent Literature

Patent Literature 1: JP 2018-182710 A

Non-Patent Literature

Non-Patent Literature 1: Blockchain Wikipedia: https://ja.wikipedia.org/wiki/%E3%83%96%E3%83%AD%E3%83%83%E3%82%AF%E3%83%81%E3%82%A7%E3%83%BC%E3%83%B3

SUMMARY OF INVENTION

Technical Problem

Managing documents in an organization with dozens of people or more is difficult with a single PC, and now it is the standard method to set up a server and build a PC network with a LAN. However, server installation and maintenance costs are not inexpensive. On the other hand, due to improvements in PC performance, although reliability is inferior, the difference in processing speed and recording capacity from servers has been reduced. For this reason, the idea of having a server function in the PC network without setting up a central server has emerged. The biggest problem here is how to synchronize and maintain the consistency of the document data that is input separately to each PC. In particular, how to eliminate malicious falsification (The Byzantine Generals problem) is a problem that is related to the basis of the reliability of document data systems.

There is a large security problem in sharing information between organizations. When trying to share document information across a plurality of organizations, the sharing function tends to be a security hole, and a lot of cost and labor are required to build a robust system.

Furthermore, on a single server, falsification of document data is not difficult at all if the staff with administrator privileges intends to do so. It has become indispensable to prove non-falsification to a third party, but it has not been easy to build the system.

The present invention has been made to solve such a conventional problem, and the purpose of the present invention is to enable linking of a plurality of PCs by peer-to-peer (P2P) to perform document management in a small organization inexpensively without using an expensive server, securing of security easily by creating a document group clone in a remote location for backup in an emergency and limiting references from other organizations to remote locations, and enabling of mutual non-falsification proof between collaborating organizations.

Solution to Problem

As a means to achieve the above purpose, a document management system according to claim 1 includes a PC group (hereinafter, PC cluster) in which a plurality of small computers (hereinafter, PCs) that create, record, and view documents are connected via a communication line including (i) a PC cluster document synchronization means that reflects a document recorded on one PC in a record of another PC belonging to the PC cluster, (ii) a document hash value generation means that generates a hash value of the document, and (iii) a blockchain generation means that forms a block by collecting a plurality of the hash value that have been generated, connects the block with an existing block to form a blockchain, and records the blockchain synchronously in the PCs in the PC cluster, a remote server recording means configured to transmit and record the document recorded synchronously in the PCs in the PC cluster or the document and the blockchain recorded synchronously in the PCs in the PC cluster also to a remote server, in which the remote server recording means further includes a plural PC cluster document group recording means that records a document group of a plurality of different PC clusters.

In the document management system according to claim 2, the document management system according to claim 1 further includes, in the PC clusters, a terminal that specializes in creating and viewing documents and is not involved in recording synchronized documents or generating a blockchain.

In the document management system according to claim 3, in the document management system according to claim 1 or 2, the remote server recording means further includes an independent document group recording means that receives and records a recording document group of an independent PC or a server client system.

In the document management system according to claim 4, the document management system according to claim 3 further includes, in the remote server recording means, a cross-functional blockchain creation means that generates a hash value of a document recorded in the plural PC cluster document group recording means and the independent document group recording means to create a blockchain.

In the document management system according to claim 5, the document management system according to any one of claims 1 to 4 further includes, in the remote server recording means, a remote server document disclosure means that confirms reference authority for a document reference request via a communication line, and discloses the document.

In the document management system according to claim 6, the document management system according to claim 5 further includes, in the remote server document disclosure means, a document non-falsification proof means that uses the hash value of the document recorded in the blockchain created by the cross-functional blockchain creation means or each of the PC clusters to prove non-falsification of a document requested to be referred.

In the document management system according to claim 7, the document management system according to claim 5 or 6 further includes, in the remote server document disclosure means, a document reference log creation means that creates a time-series record of the document reference request via the communication line.

In the document management system according to claim 8, the document management system according to claim 7 further includes, in the document reference log creation means, a document reference log non-falsification proof means that generates a hash value of each reference log to form a block chain to enable non-falsification function proof Advantageous Effects of Invention Since the document management system according to claim 1 includes the PC cluster document synchronization means that reflects a document recorded in one PC to a record of another PC belonging to the PC cluster, it is possible to record a document synchronously in a plurality of inexpensive PCs.

Since the document management system includes the document hash value generation means that generates a hash value of a document, it is possible to prove the authenticity of the document and prevent falsification.

Since the document management system includes the blockchain generation means, it is possible to form a block by collecting a plurality of generated hash values, connect the block with an existing block to form a blockchain, and record the blockchain synchronously with the PCs in the PC cluster.

Since the document management system according to claim 1 includes the remote server recording means, it is possible to store/use the document recorded synchronously in the PCs in the PC cluster, or the document and the blockchain recorded synchronously in the PCs in the PC cluster, in remote locations.

Since the document management system according to claim 1 includes the plural PC cluster document group recording means, it is possible to collectively record and manage a plurality of different PC cluster document groups in a cloud.

Since the document management system according to claim 2 includes, in the PC cluster, a terminal that specializes in creating and viewing documents and is not involved in recording synchronized documents or generating a blockchain, it is possible to use a weak external terminal such as a mobile terminal.

Since the document management system according to claim 3 includes the independent document group recording means, it is possible to receive and manage the recorded document group of an independent PC or a server-client system in the cloud.

Since in the document management system according to claim 4 includes the cross-functional blockchain creation means, it is possible to generate a hash value of a document recorded in the plural PC cluster document group recording means and the independent document group recording means to create a blockchain.

Since the document management system according to claim 5 includes the remote server document disclosure means, it is possible to confirm reference authority for a document reference request via a communication line and disclose the document.

Since the document management system according to claim 6 includes the document non-falsification proof means, it is possible to use the hash value of the document recorded in the blockchain created by the cross-functional blockchain creation means or each of the PC clusters to prove non-falsification of a document requested to be referred to.

Since the document management system according to claim 7 includes the document reference log creation means, it is possible to create a time-series record of the document reference request via the communication line.

Since the document management system according to claim 8 includes the document reference log non-falsification proof means, it is possible to generate a hash value of each reference log to form a block chain to enable non-falsification function proof.

DESCRIPTION OF EMBODIMENTS

Figure 1:
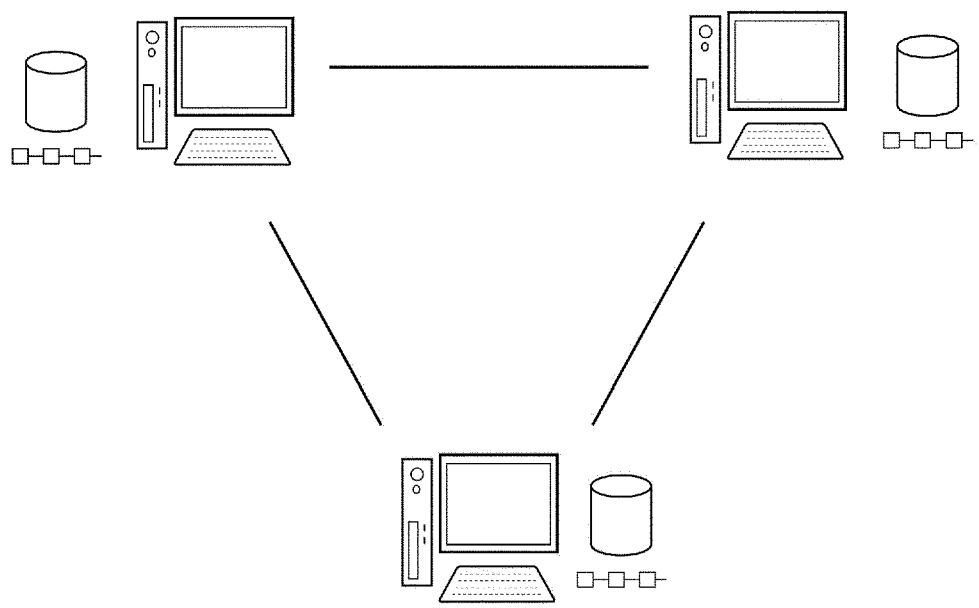
FIG. 1 is a diagram showing a PC network within a single organization of the present invention.

FIG. 1 is a diagram showing a PC network within a single organization of the present invention.

PCs are connected by a network, and document data created individually by each PC is recorded synchronously in a document recording device of another PC via the network (PC cluster document synchronization means). A hash value is created simultaneously for each document (document hash value generation means), and a block containing a plurality of hash values is created in a chain shape, and recorded synchronously in all PCs (blockchain generation means). The network can be wired/wireless LAN or WAN.

Figure 2:
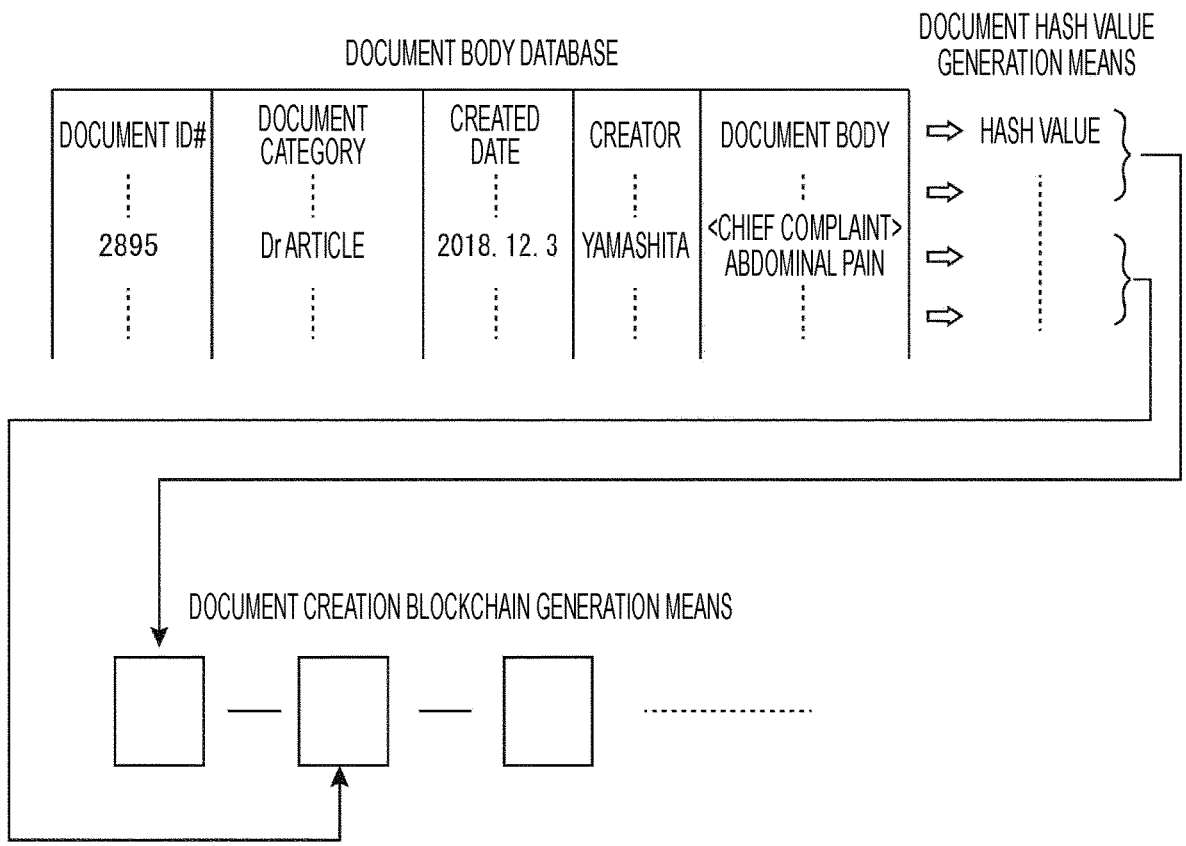
FIG. 2 is a diagram showing a configuration in each PC in FIG. 1.

FIG. 2 is a diagram showing an internal configuration of each PC in FIG. 1. Documents created on each PC are transmitted and recorded not only on the PC but also on other PCs on the network.

Here, the document may be an individual independent file, but the document is often recorded as one record of a database management system such as a relational database (RDB) as shown in the drawing so that the document can be used for searching or the like later. As a database, any kind of database is included in the contents of the present invention, but in the description of the present invention, an RDB will be used for explanation. Although the present application takes the medical field as an example, the field is not particularly limited.

Auxiliary files such as document categories and master files for staff are naturally used, but since this part does not involve specific and individual contents and does not changes often, using the part as a target of falsification prevention using a blockchain or the like may be meaningless.

A hash value is generated for each record (document hash value generation means). As a target range of hash value generation, the entire record including text data of a document body from the document ID # of the first term is desirable, but the target range may be a partial item group including the document body.

After a plurality of hash values are generated, a block of the plurality of hash values is formed at a well-separated portion, and a hash value of the entire block is generated by the plurality of hash values included in the block.

When the next block is formed, the hash value of the next block is formed together with the hash value of the previous block. As described above, if even a part of a document record is falsified, the hash value of the document record, the hash value of the block, and the hash value of the next block will be inconsistent one after another. Therefore, to falsify a document record, the hash values of all blocks of the document and thereafter must be rewritten. Since such rewriting work is actually difficult, the non-falsification of the document group is proved (blockchain generation means).

There are various methods for creating a blockchain, and there are many methods other than the above, but any of them is included in the present invention. In a public chain where the participating PCs are unspecified, block creation authority is given to the first person who finds a numerical solution that satisfies the conditions to ensure consistency (Proof-of-Work).

In the present invention, as shown in FIG. 1, since the number of participating PCs is limited (private chain), and even if it is falsified, there is no economic benefit like Bitcoin, the amount of computational resources used is overwhelmingly small in assignment of block creation authority by decision by a majority (Proof-of-Stake), and the Proof-of-Stake is realistic.

Figure 3:
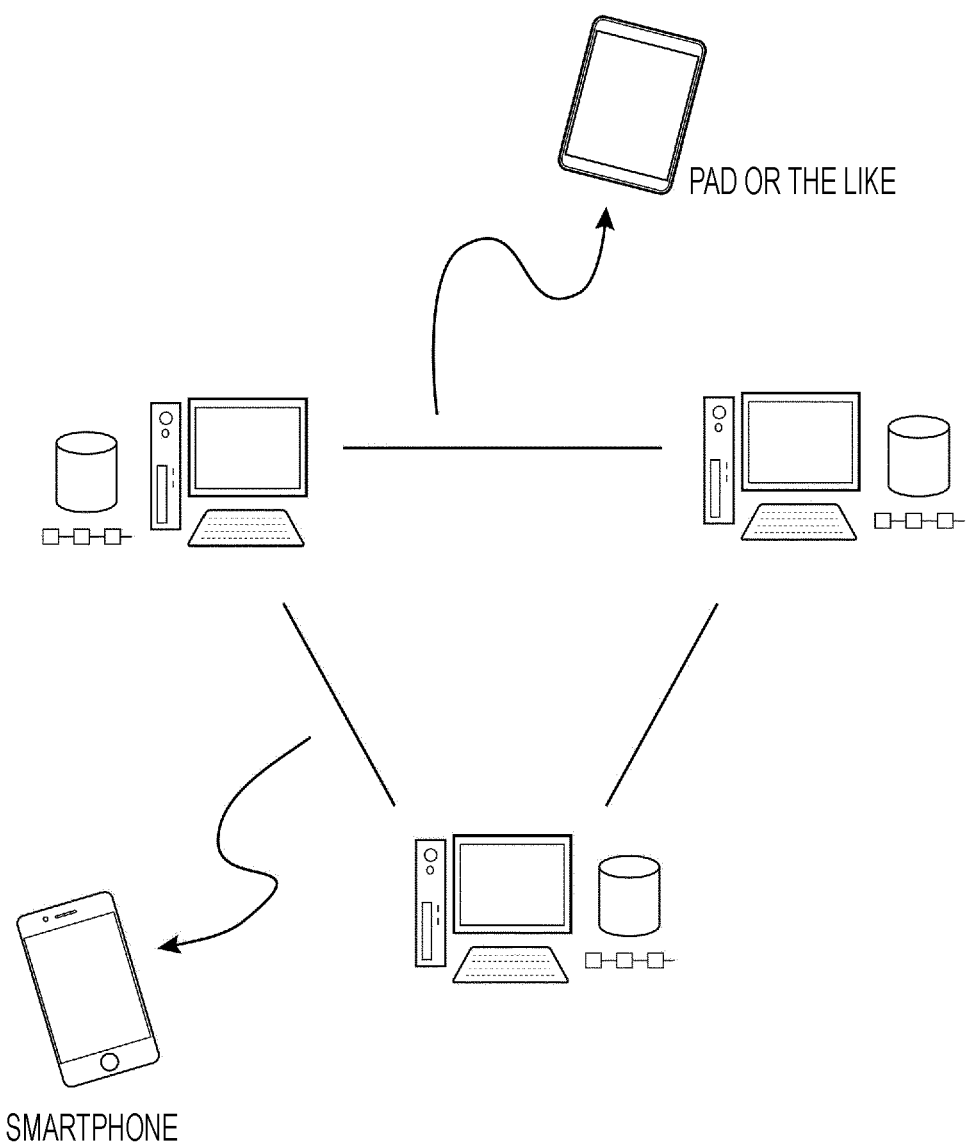
FIG. 3 is a diagram of an in-house PC network that includes a PC terminal that is not involved in document recording or blockchain creation and exclusively specializes in reference and document creation.

FIG. 3 explains that the PC clusters also includes a terminal that specializes in creating and viewing documents and is not involved in recording synchronized documents or generating a blockchain.

Due to the portability in the field, many terminals with limited CPUs and limited recording capacity are also used.

If such a weak terminal is responsible for recording synchronization and blockchain generation, the overall efficiency will rather decrease.

For this reason, on terminals such as PADs and smartphones, a configuration may be useful in which a terminal such as a PAD and a smartphone only performs reference of synchronized records and creation/edition of documents, and a network of a PC having sufficient capability performs generation of a blockchain.

Figure 4:
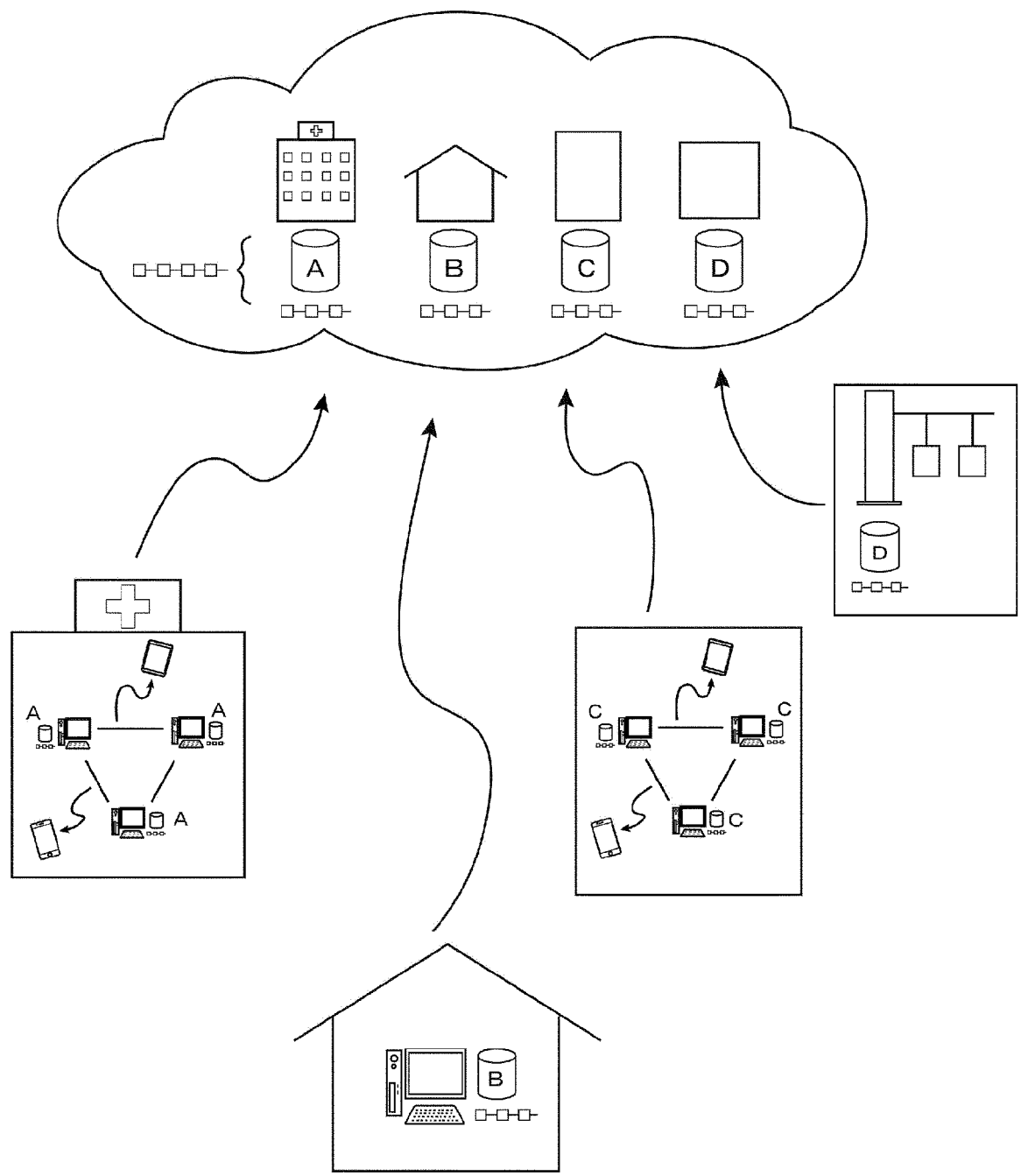
FIG. 4 is a diagram in which a document group recorded by various organizations are transmitted to the cloud and recorded synchronously.

FIG. 4 shows a configuration (remote server recording means) in which document data or a blockchain is backed up in a cloud, in a clone group (plural PC cluster document group recording means) of document data and a blockchain of a PC network of the present invention developed in each organization, and also in a clone group (independent document group recording means) of document data of various forms of document management systems such as a PC alone or server/client.

Even for a single PC or a normal server/client system not included in the present invention, it is useful to keep a backup on the cloud in case of a disaster from the viewpoint of business data preservation, which is essential for business continuity (independent document group recording means). Since records are not a distributed in a PC alone or a normal server/client system, it is not always necessary to generate a blockchain, but it can function as a barrier against falsification.

Figure 5:
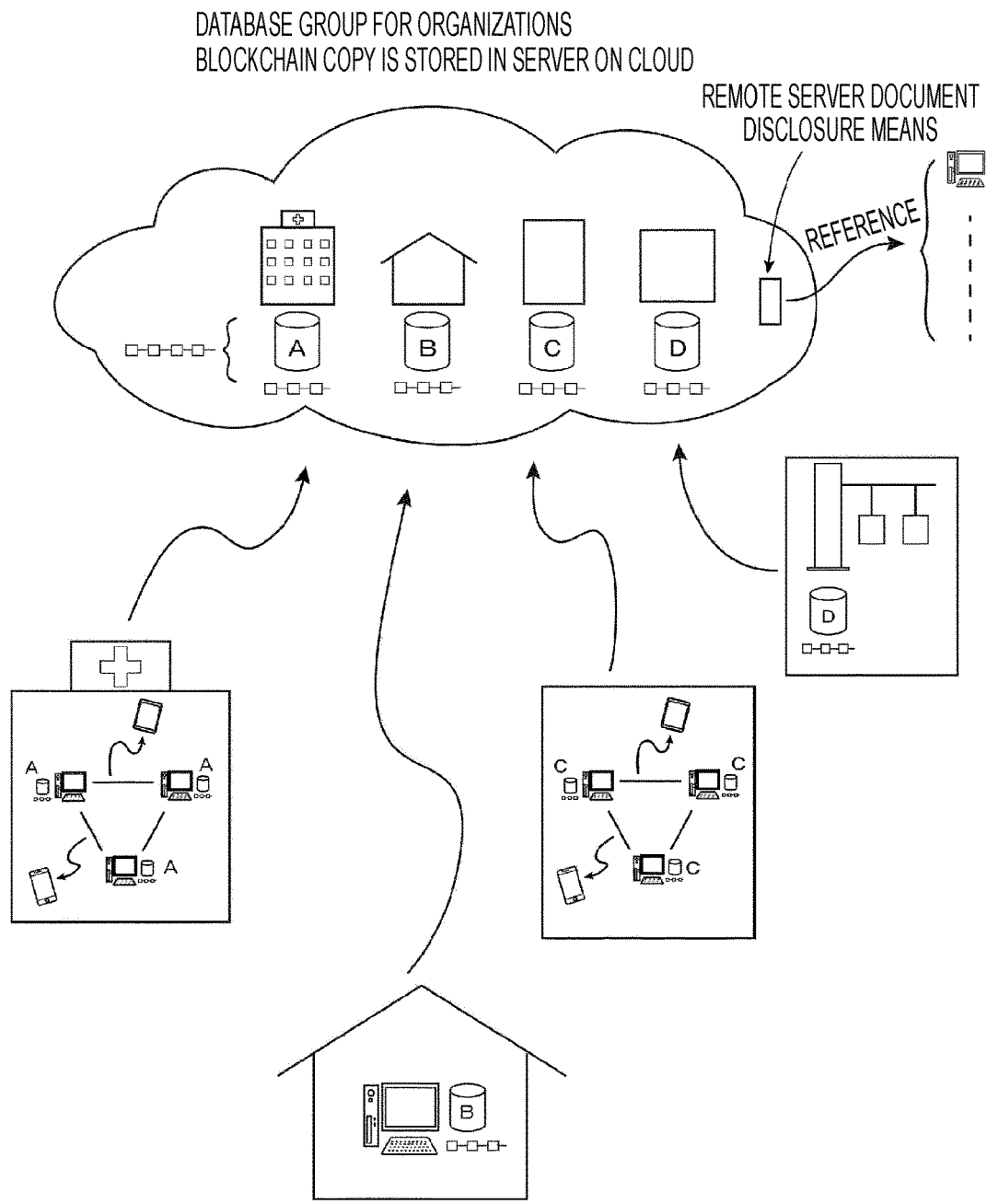
FIG. 5 is a diagram showing that all reference requests from other than own organization are handled in the cloud, and even if falsification is made, records on a PC network in own organization are not affected.

FIG. 5 shows a remote server document disclosure means that confirms reference authority for a document reference request via a communication line and discloses the document for document data recorded in the remote server recording means. If necessary, it is also useful to use a blockchain to prove that the disclosed document has not been falsified (document non-falsification proof means).

Conventionally, each independent organization has responded to reference requests from outside the organization, but the risk of cyber attacks is increasing, and it is becoming difficult for small organizations to provide sufficient defense. In particular, falsification of business data due to intrusion from the outside can be fatal.

In the present invention, individual organizations send data in only one direction to the cloud, the response to references from outside the organization is limited to the cloud, and after confirming the reference authority, the document synchronized on the cloud is disclosed. Although all the disclosures may be made by the method of the present invention, the conventional disclosures for each organization may be made for some organizations.

In this way, it becomes easy for multiple organizations to jointly take protective measures against server attacks. Since the original organization data is transmitted in one direction to the cloud, even if it is intruded, only the synchronized data on the cloud will be damaged, and there is no risk of the original organization data being damaged. Data in the cloud can be easily restored by resending the original data of the organization.

If the remote server document disclosure means includes a document reference log creation means that creates a time-series record of a document reference request via the communication line, even when the attack record is recorded even in the unlikely event of a cyber attack, it becomes easier to take measures.

Further, the document reference log creation means includes a document reference log non-falsification proof means that generates a hash value of each reference log to form a block chain to enable non-falsification function proof, since it becomes difficult to erase the traces of the attack in a case of a cyber attack, it becomes easier to take measures.

Figure 6:
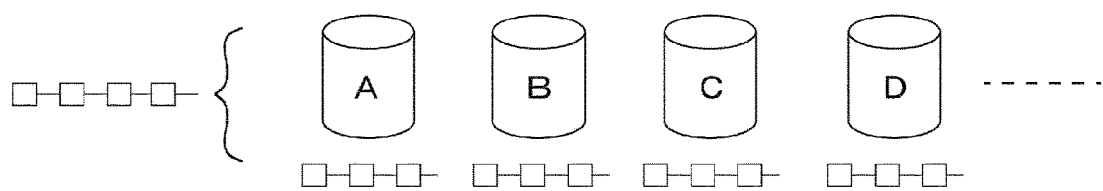
FIG. 6 is a conceptual diagram in which hash values creation and blockchain forming are performed in a cross-functional manner for records of each organization in the cloud.

FIG. 6 is explanation of a cross-functional blockchain creation means that generates a hash value of a document recorded in a cross-functional manner not only for a synchronous record of the plural PC cluster document group recording means of the present invention being on a cloud and a synchronous record of a PC alone or a normal server/client system not included in the present invention to create a blockchain. Every time new document data is synchronously recorded on the cloud, a document hash value is generated, and a blockchain is generated based on the document hash value.

As a result, for the record of the plural PC cluster document group recording means of the present invention, a blockchain is generated twice including not only the original blockchain of the organization but also blockchains of other organizations, so that difficulty of falsification is further strengthened.

The non-falsification proof by the blockchain is possible even for the record of the PC alone or the normal server/client system not included in the present invention.

Although the embodiments have been described above, the specific configuration of the present invention is not limited to the above embodiments, and the present invention includes design changes and the like within a range that does not deviate from the gist of the invention.

The invention claimed is:

1. A document management system comprising:
a PC cluster being a PC group in which a plurality of small computers (PCs) that create, record, and view documents are connected via a communication line,
wherein each of the PCs in the PC cluster is configured to:
reflect a document recorded on one PC in a record of another PC belonging to the PC cluster to synchronize documents in the PC cluster,
generate a plurality of hash values of the document recorded on one PC,
form a block by collecting the plurality of hash values that have been generated, connect the block with an existing block to form a blockchain, and record on the one PC the blockchain synchronously in the PCs in the PC cluster, and
transmit the documents and the blockchain recorded synchronously in the PCs in the PC cluster to record also to a remote server as a clone,
wherein the remote server stores copies of document groups and blockchains of a plurality of different PC clusters that belong to independent different organizations and form blockchain networks.

2. The document management system according to claim 1, further comprising, in the PC clusters, a terminal that specializes in creating and viewing documents and is not involved in recording synchronized documents or generating a blockchain.

3. The document management system according to claim 1, wherein the remote server is further configured to receive and record a recording document group and the blockchain of an independent PC or a server client system.

4. The document management system according to claim 1, the remote server is further configured to in a cross-functional manner generate a hash value of the document group recorded on the remote server to create a cross-functional blockchain.

5. The document management system according to claim 4, the remote server is further configured to use the hash value of the document recorded in the blockchain created by each of the PC clusters or the hash value of the document group in the cross-functional blockchain to prove non-falsification of a document requested to be referred to.

6. The document management system according to claim 1, the remote server is further configured to confirm reference authority for a document reference request via a communication line, and disclose the document.

7. The document management system according claim 6, the remote server is further configured to create as a reference log a time-series record of the document reference request via the communication line.

8. The document management system according to claim 7, the remote server is further configured to generate a hash value of each reference log to form a blockchain and enable non-falsification proof.

9. A method that performs in a document management system comprising a PC cluster being a PC group in which a plurality of small computers (PCs) that create, record, and view documents are connected via a communication line, the method that causes each of the PCs in the PC cluster to execute:
reflecting a document recorded on one PC in a record of another PC belonging to the PC cluster to synchronize documents in the PC cluster,
generating a plurality of hash values of the document recorded on one PC,
forming a block by collecting the plurality of hash values that have been generated, connecting the block with an existing block to form a blockchain, and recording on the one PC the blockchain synchronously in the PCs in the PC cluster, and
transmitting the documents and the blockchain recorded synchronously in the PCs in the PC cluster to record also to a remote server as a clone,
wherein the method that causes the remote server to store copies of document groups and blockchains of a plurality of different PC clusters that belong to independent different organizations and form blockchain networks.

* * * * *